United States Patent
Hentunen

(10) Patent No.: US 10,432,646 B2
(45) Date of Patent: Oct. 1, 2019

(54) PROTECTION AGAINST MALICIOUS ATTACKS

(71) Applicant: F-Secure Corporation, Helsinki (FI)

(72) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 253 days.

(21) Appl. No.: 15/378,172

(22) Filed: Dec. 14, 2016

(65) Prior Publication Data

US 2017/0180401 A1    Jun. 22, 2017

(30) Foreign Application Priority Data

Dec. 18, 2015  (GB) .................................. 1522382.9

(51) Int. Cl.
*H04L 29/06*    (2006.01)
*H04L 12/26*    (2006.01)

(52) U.S. Cl.
CPC ........ *H04L 63/1416* (2013.01); *H04L 43/062* (2013.01); *H04L 63/1425* (2013.01)

(58) Field of Classification Search
CPC ............. H04L 63/1416; H04L 63/1425; H04L 43/062
See application file for complete search history.

(56) References Cited

U.S. PATENT DOCUMENTS

| | | | | |
|---|---|---|---|---|
| 7,296,155 B1* | 11/2007 | Trostle | ................ | H04L 63/1441 713/170 |
| 8,316,440 B1* | 11/2012 | Hsieh | .................... | G06F 11/108 713/168 |
| 8,370,933 B1* | 2/2013 | Buckler | .................. | H04L 63/14 709/223 |
| 8,656,490 B1* | 2/2014 | Sobel | .................. | H04L 61/1511 709/227 |
| 8,966,625 B1* | 2/2015 | Zuk | ........................ | H04L 63/145 709/227 |
| 9,386,038 B2* | 7/2016 | Martini | ................. | H04W 76/10 |
| 2002/0138634 A1* | 9/2002 | Davis | ...................... | G06F 9/465 709/229 |
| 2004/0030776 A1* | 2/2004 | Cantrell | .................. | H04L 29/06 709/224 |
| 2005/0259645 A1* | 11/2005 | Chen | ................. | H04L 29/12066 370/389 |

(Continued)

*Primary Examiner* — Darren B Schwartz
(74) *Attorney, Agent, or Firm* — Harrington & Smith

(57) ABSTRACT

There provided a method, including executing on a processor the steps of: monitoring DNS related network traffic including domain name-to-IP key value pairs, monitoring at least such non-DNS related network traffic that is targeting routable IP addresses, determining whether the monitored non-DNS related network traffic is related to a domain name, in the event that the monitored non-DNS related network traffic is determined to be related to a domain name, searching the monitored DNS related network traffic for a matching domain name, in the event that the matching domain name is found in the search, determining whether IP addresses related to the matching domain names also match, and in the event that the IP addresses related to the matching domain names do not match, determining that an internal name-to-IP resolution from a local configuration file is used for the domain name and triggering an alert.

11 Claims, 4 Drawing Sheets

(56) References Cited

U.S. PATENT DOCUMENTS

| | | | |
|---|---|---|---|
| 2006/0133377 A1* | 6/2006 | Jain | H04L 63/1408 370/392 |
| 2007/0027992 A1* | 2/2007 | Judge | G06Q 10/107 709/227 |
| 2007/0083670 A1* | 4/2007 | Kelley | H04L 29/12066 709/245 |
| 2007/0156900 A1* | 7/2007 | Chien | G06F 21/645 709/225 |
| 2008/0060054 A1* | 3/2008 | Srivastava | H04L 29/12066 726/2 |
| 2008/0147837 A1* | 6/2008 | Klein | H04L 29/12066 709/223 |
| 2009/0055928 A1* | 2/2009 | Kang | G06F 21/554 726/22 |
| 2009/0083413 A1* | 3/2009 | Levow | H04L 29/12066 709/224 |
| 2009/0089426 A1* | 4/2009 | Yamasaki | H04L 29/12066 709/225 |
| 2009/0089859 A1* | 4/2009 | Cook | H04L 51/12 726/3 |
| 2010/0031362 A1* | 2/2010 | Himberger | H04L 29/12066 726/25 |
| 2011/0191455 A1* | 8/2011 | Gardner | H04L 29/12066 709/223 |
| 2011/0302656 A1* | 12/2011 | El-Moussa | H04L 63/1425 726/24 |
| 2012/0324094 A1* | 12/2012 | Wyatt | H04W 4/60 709/224 |
| 2013/0318170 A1* | 11/2013 | Crume | H04L 63/1408 709/206 |
| 2014/0281032 A1* | 9/2014 | Roskind | G06F 17/30861 709/245 |
| 2014/0310811 A1* | 10/2014 | Hentunen | H04L 63/1441 726/23 |
| 2014/0317730 A1* | 10/2014 | Ashley | H04L 63/12 726/22 |
| 2015/0195245 A1 | 7/2015 | Batz et al. | |
| 2015/0207809 A1* | 7/2015 | MacAulay | G06F 21/552 726/22 |
| 2015/0312100 A1* | 10/2015 | Chan | H04L 63/10 709/222 |
| 2016/0150004 A1* | 5/2016 | Hentunen | H04L 67/1036 726/23 |
| 2016/0255012 A1* | 9/2016 | Mizrachi | H04L 63/00 370/230 |
| 2016/0366176 A1* | 12/2016 | Bennison | H04L 63/1441 |
| 2017/0155667 A1* | 6/2017 | Sobel | H04L 63/1416 |

\* cited by examiner

PROTECTION AGAINST MALICIOUS ATTACKS

FIELD

The present invention relates to protecting computer systems against malicious attacks. More specifically, the present invention relates to measures (including methods, apparatuses and computer program products) for enabling/realizing an integrity check of name-to-IP resolution setting, thus detecting e.g. a pharming attack.

BACKGROUND

In recent years, use of DNS (Domain Name System) has increasingly spread such that nowadays many services (including various protocols, applications, technologies etc.) are using the DNS for address resolution. That is, services using DNS rely on a valid DNS server setting for providing the service-requesting entity with appropriate functionalities, or the like. Accordingly, the DNS, particularly the DNS related settings, has become an attractive target for attacks on the proper functioning of such services using DNS. By way of manipulating the DNS server setting being utilized by a specific service for address resolution, an attacker tries to misdirect the service to a fraudulent address (instead of the actually intended address for service provisioning) without its knowledge or consent.

As one example scenario in this regard, attacks on users over the Internet have become popular, by which users are misdirected to fraudulent Web sites without their knowledge or consent. Such attacks are often referred to as "pharming" attacks.

In such pharming attacks, the DNS server setting is manipulated, which can generally be done at any point in the DNS resolving chain from the first DNS resolver to the root DNS server. For example, such pharming attacks can be implemented on a client device by locally manipulating the DNS server setting, or on some device keeping the DNS server setting, such as a DHCP (Dynamic Host Configuration Protocol) server device, by setting a rogue DNS server address.

That is, in a local network environment, the DNS server setting potentially being subject to such pharming attack can be configured in a client device or another local-area device such as a local-area DHCP server device like e.g. a router in the local network environment, e.g. a home or SOHO-type router, or a (wireless) base station or access point in the local network environment.

Typically, pharming can be achieved by replacing the real IP addresses associated with legitimate websites with IP addresses of fake websites. Pharming attacks may occur by attacking hosts files or other local configuration files that may be used for resolution on individual computers. Hosts file is a computer file used to map hostnames to IP addresses by an operating system. The hosts file assists in addressing network nodes in a computer network. It is a part of an operating system's Internet Protocol (IP) implementation, and serves the function of translating hostnames into numeric protocol addresses, called IP addresses, that identify and locate a host in an IP network.

The hosts file may present an attack vector for malicious software. The file may be modified, for example, by adware, computer viruses, or trojan horse software to redirect traffic from the intended destination to sites hosting malicious or unwanted content.

U.S. Pat. No. 8,316,440 describes a way of monitoring changes to hosts file. Specifically it teaches monitoring changes to IP addresses assigned for specific domains in the file and keeps track of IP addresses assigned for the same domain seen in the past. Then it calculates the magnitude of change between the current IP address value for the specific domain and the historical value assigned for the same domain. If the magnitude of change is over a predetermined threshold, then it is treated as indication of a malicious change.

However, we have recently seen adware that does not actually change the hosts file but, for example, the Windows binary that is responsible for using the hosts file for using some other file as its hosts file. This kind of adware may create a new hosts file with a random name in a random directory location. Then it patches dnsapi.dll in order to force the operating system to use the new hosts file instead of the original. These kinds of malicious tricks would not be noticed by prior art solutions, such as U.S. Pat. No. 8,316,440, as they only monitor the hosts file.

Accordingly, there is a demand to improve security of computer systems to detect and prevent also these kinds of malicious attacks.

SUMMARY

Various exemplifying embodiments of the present invention aim at addressing at least part of the above issues and/or problems.

The invention is defined by the subject-matter of the independent claims.

Various aspects of exemplifying embodiments of the present invention are set out in the dependent claims.

BRIEF DESCRIPTION OF THE DRAWINGS

In the following, the present invention will be described in greater detail by way of non-limiting examples with reference to the accompanying drawings, in which FIG. 1, comprising

DETAILED DESCRIPTION

Figure 1A:
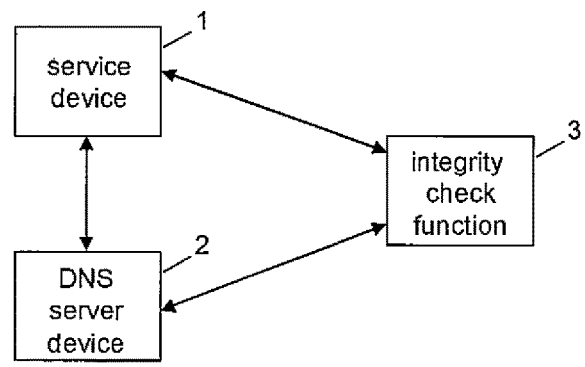
FIGS. 1A and 1B, shows schematic diagrams illustrating system configurations, for which exemplifying embodiments of the present invention are applicable.

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling/realizing an integrity check of name-to-IP resolution, thus enabling/realizing detection of malicious changes to name-to-IP resolution setting used by any service in any scenario.

FIG. 1A shows a schematic diagram illustrating a system configuration, for which exemplifying embodiments of the present invention are applicable.

As shown in FIG. 1A, exemplifying embodiments of the present invention generally relate to a basic system configuration in which a service device 1, a DNS server device 2 (which may be a recursive DNS server device) and an integrity check function 3 (being implemented by/at some device or combination/interworking of devices) are interconnected. The service device 1 generally represents any device (including standalone apparatuses and parts thereof) which is configured to provide at least one service to a service-requesting entity. Such service can be provided as or by any protocol, application, technology, or the like. The DNS server device 2 generally represents any device (including standalone apparatuses and parts thereof) which is configured to provide for DNS-based address resolution functionality. The service device 1 and the DNS server device 2 cooperate for realizing DNS-based address resolution for (provision of) the at least one service provided by the service device 1. The integrity check function represents any means (including standalone apparatuses and structural parts and/or functional parts (such as software) thereof) which is configured to check integrity of a DNS server setting.

In the present system configuration, a DNS resolution operation between the service device 1 and the DNS server device 2 is based on a direct connection there-between, i.e. a single link/hop for transmission of DNS messages (or, stated in other words, a single request for DNS resolution towards the DNS server device). The integrity check function 3 is configured to check integrity of name-to-IP resolution used by any device in the system. That is, DNS hacking or hijacking at the DNS server device 2 or at the service device 1 can be checked in such system configuration.

Figure 1B:
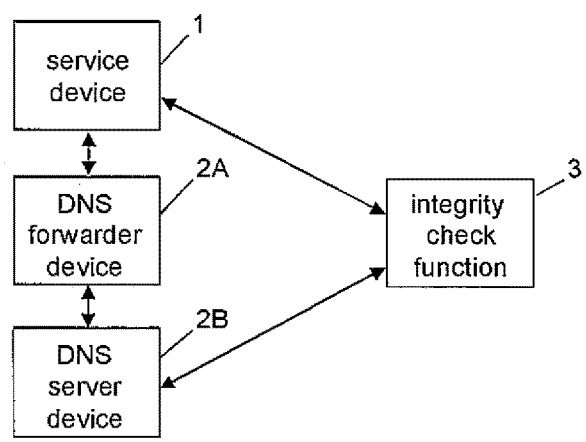

FIG. 1B shows a schematic diagram illustrating a system configuration, for which exemplifying embodiments of the present invention are applicable.

As shown in FIG. 1B, exemplifying embodiments of the present invention generally relate to a basic system configuration in which a service device 1, a DNS forwarder device 2A, a DNS server device 2B (which may be a recursive DNS server device) and an integrity check function 3 (being implemented by/at some device or combination/interworking of devices) are interconnected. The functionality of the service device, the DNS server device and the integrity check function are basically the same as in the system configuration of FIG. 1A, and reference is made to the above for details. As compared with the system configuration of FIG. 1A, the service device 1 and the DNS server device 2A cooperate, via the DNS forwarder device 2A, for realizing DNS-based address resolution for (provision of) the at least one service provided by the service device 1. Thereby, the DNS forwarder device 2A generally represents any device (including standalone apparatuses and parts thereof) which is configured to relay DNS messages in order to support DNS-based address resolution between the service device 1 and the DNS server device 2B. While only a single DNS forwarder device 2A is exemplarily illustrated, any number of DNS forwarder devices 2A may be involved in the DNS-based address resolution between the service device 1 and the DNS server device 2B.

In an example system configuration, a DNS resolution operation between the service device 1 and the DNS server device 2B is based on an indirect connection there-between via one or more DNS forwarder devices 2A, i.e. multiple links/hops for transmission of DNS messages (or, stated in other words, a chain of requests for DNS resolution towards the DNS server device).

According to exemplifying embodiments of the present invention, such basic system configuration can be implemented/realized in different situations, i.e. different scenarios, network topologies, system environments, or the like. Accordingly, depending on the underlying situation, the service device, the DNS server device, the DNS forwarder device (if any) and the integrity check function can be implemented/realized in different network elements or entities.

Although the service device, the DNS server device, the DNS forwarder device (if any) and the integrity check function are exemplarily illustrated as separate blocks, they can also be implemented/realized (at least partly) at the same network element or entity. For example, the service device and its related DNS server device (potentially including at least one related DNS forwarder device) can be collocated/integrated.

Generally speaking, assuming a simple system configuration including a client, a gateway and a server, the target/victim of DNS hacking or hijacking may be any one of these network elements or entities. When the integrity check function is implemented/realized at/on the client, potential DNS hacking or hijacking at/on, or affecting, the gateway and/or the server can be checked, or when the integrity check function is implemented/realized at/on the gateway, potential DNS hacking or hijacking at/on, or affecting, the client and/or the server can be checked, or when the integrity check function is implemented/realized at/on the server, potential DNS hacking or hijacking at/on, or affecting, the client and/or the gateway can be checked.

Just to mention some examples, the following examples are conceivable in this regard, while the present invention is not restricted thereto.

The service device can be (at/on) a client device (e.g. an end-user, a computer involved in a local-area network or a wide-area network connection, a router device, a DHCP server device, a network access point (e.g. a (wireless) WLAN access point, a (wireless) base station, any kind of server (e.g. a web server, a HTTP server, a SMTP server, an e-mail server, a closed subscriber group server (i.e. a server managing a closed subscriber group such as for a forum, an online shop, or the like), representing an source point of service provisioning, any kind of proxy device (e.g. a web proxy, a HTTP proxy, a SMTP proxy, representing an intermediate point of service provisioning, a Tor exit-node, a VPN (provider) exit node, or the like.

The service device can utilize any protocol, application, technology, or the like. For example, depending on the service being provided, an applicable protocol may be any one of HTTP (Hypertext Transfer Protocol), HTTPS (Hypertext Transfer Protocol Secure), RPC (Remote Procedure Call), SMTP (Simple Mail Transfer Protocol), TCP (Transmission Control Protocol), UDP (User Datagram Protocol) or any other protocol capable of transporting service-related traffic. For the purpose and applicability of the present invention, the kind of service actually (to be) provided and/or the underlying protocol, technology, etc. is not limited anyhow. Also, for the purpose and applicability of the present invention, the service can be provided to/for any conceivable application, including any communication-based application, any IoT (Internet-of-Things) application, or the like.

The integrity check function can be implemented/realized at/on any one of any kind of server (e.g. a web server, a HTTP server, a SMTP server) representing an target point of service provisioning, any kind of proxy device (e.g. a web proxy, a HTTP proxy, a SMTP proxy) representing an intermediate point of service provisioning, an inline IDS (Intrusion Detection System) device representing an intermediate point of service provisioning for the purpose of intrusion detection, a client device (e.g. an end-user, a computer involved in a local-area network or a wide-area network connection), or the like.

Figure 2:
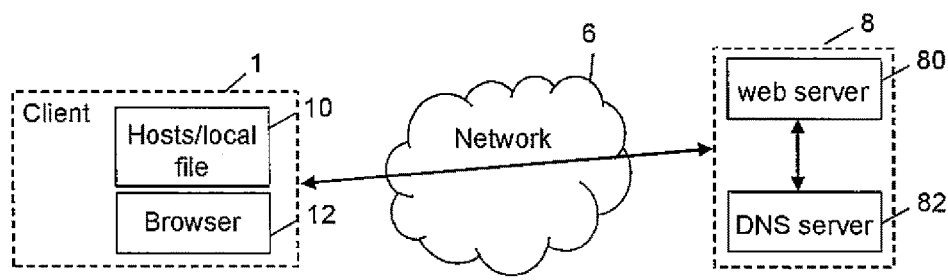
FIG. 2 shows an example of a structure of an apparatus and system according to exemplifying embodiments of the present invention.

FIG. 2 shows an example structure of an apparatus and system according to exemplifying embodiments of the present invention. It shows a simplified network environment in which example embodiments can be implemented.

Various implementations of the present invention may be realized in a wide variety of network environments (network 6). The software program implementing various embodiments may be executed on various client devices and apparatuses 1, for example, on a stand-alone computer devices, notebooks, handheld computers that are able to access the network 6.

Any number of servers and/or server systems 8, 80, 82 are also connected to the network 6. In the FIG. 2 example, an application/web server 80 is used to host websites and a DNS server 82 performs name-to-IP resolution for the client 1.

An embodiment of the present invention solves a problem of detecting malicious changes to hosts file 10 (or any other local configuration file that may be used for resolution) in the client 1. In practice, this may be implemented by detecting whether a domain with a routable IP address has an entry in the hosts file 10. Typically hosts file should only include entries in LAN and in exceptional cases, these entries can be whitelisted per client basis. Thus, an embodiment of the present invention detects if the client 1 is configured to use a preconfigured domain resolution verdict from the hosts file 10 instead of performing a normal DNS resolution over the network 6.

Figure 3:
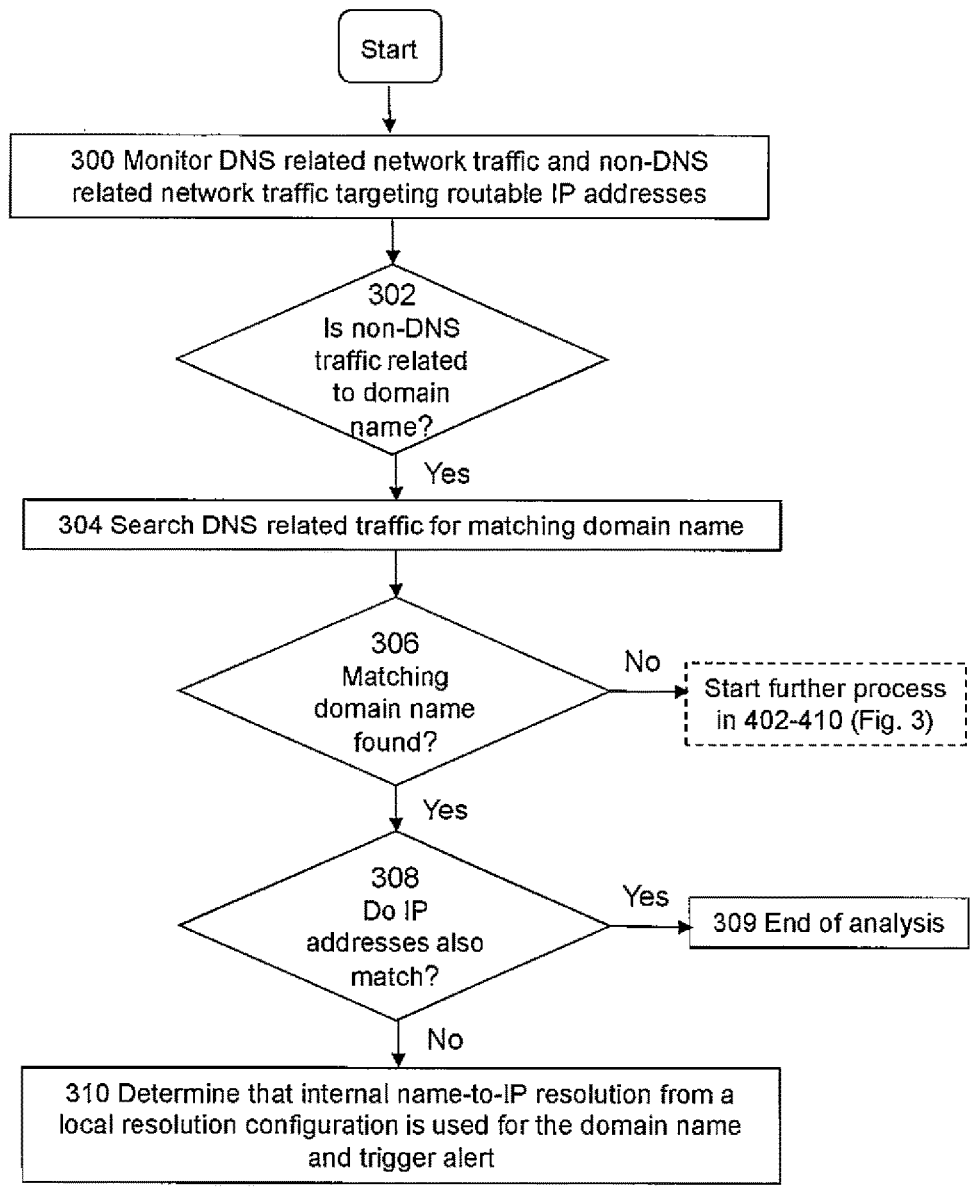
FIG. 3 shows a flowchart illustrating a method according to exemplifying embodiments of the present invention.

FIG. 3 shows a flowchart illustrating a computer-implemented method for protecting a computer from malicious attacks according to exemplifying embodiments of the present invention. The thus illustrated method may be generally executed by/at the integrity check function 3, and may be directed to check integrity of name-to-IP resolution used in any device of the system.

As shown in FIG. 3 the method according to exemplifying embodiments of the present invention starts at 300 where DNS related network traffic comprising domain name-to-IP key-value pairs is monitored. Further, at least such non-DNS related network traffic that is targeting routable IP addresses is also monitored. This step can be realized by having a component 3 on the network or a component 3 on the host that is configured to record at least part of DNS traffic. Mainly domain name-to-IP address key-value pairs are stored from the monitored network traffic. For example, a query for "facebook.com" may get an IP address "1.2.3.4" as a reply. The same component can also monitor all non-DNS network traffic. However, other components can also be used for monitoring the non-DNS traffic in some embodiments. In an embodiment, only network traffic targeting routable IP addresses is monitored.

In 302, it is determined whether the non-DNS network traffic monitored in 300 is related to a domain name. This can be realized in a number of different processes depending on a protocol used. For example, for HTTP traffic this step may be implemented by looking at the content of the HTTP header field "Host:", whereas for HTTPS traffic this may be implemented by looking at the TLS extension "server_name" from a "Client Hello"-message. In case for SMTP traffic, the process may be implemented by parsing an SMTP server's domain from the first line that the server is sending, for example, "220 smtp.example.com ESMTP Postfix".

In the event that the monitored non-DNS related network traffic is determined to be related to a domain name, 304-306 is entered where the monitored DNS related network traffic is searched for a matching domain name. In the event that the matching domain name is found in the search, 308 is entered where it is determined whether IP addresses related to the matching domain names also match.

In the event that the IP addresses related to the matching domain names do match, 308 is entered where it is determined that a local resolution configuration/hosts file has not been modified regarding this domain name and 310 may be entered where the analysis is ended.

In the event that the IP addresses related to the matching domain names do not match, 310 is entered where it is determined that an internal name-to-IP resolution from a local resolution configuration/hosts file is used for the domain name and an alert is triggered.

In an embodiment, the triggering of alert comprises at least one of: sending an email message, displaying message in a pop-up window, generating an instant message, generating a text message. Triggering of alert may also comprise preventing or restricting communication related to the suspicious domain name when the internal name-to-IP resolution to the local configuration file is determined to be used for the domain name.

In the event that matching domain names were not found in 306, then further analysis process may be started (see FIG. 4 description below for steps 402-410).

Figure 4:
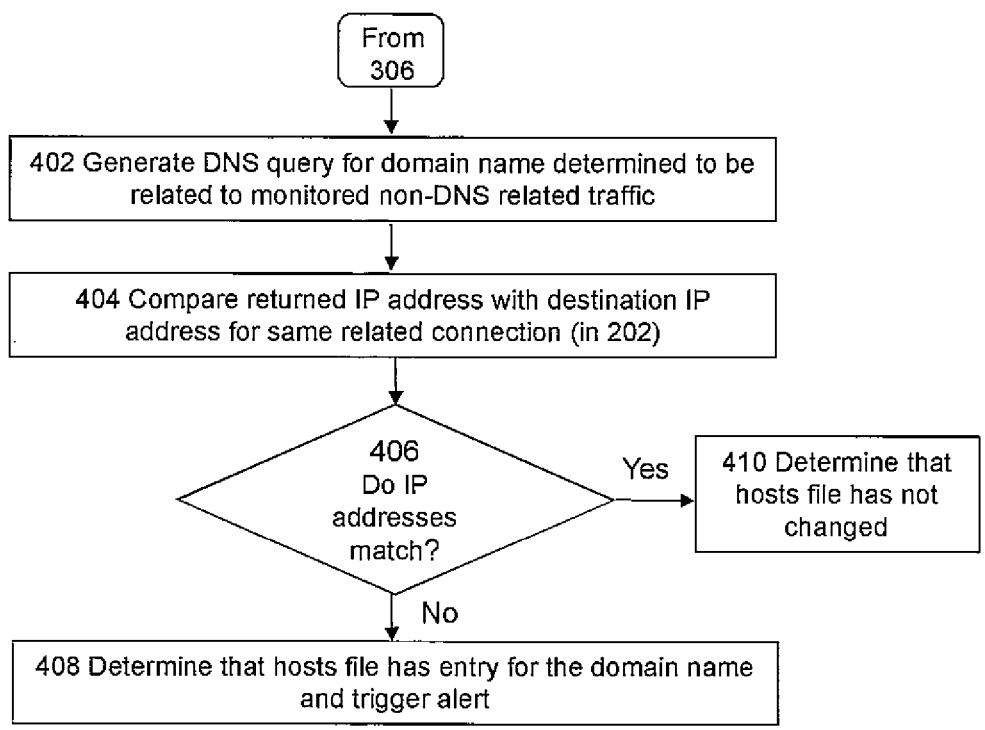
FIG. 4 shows another flowchart illustrating a method according to exemplifying embodiments of the present invention.

FIG. 4 shows another flowchart illustrating a method according to exemplifying embodiments of the present invention.

In the event that matching domain names were not found in the method step 306 described in FIG. 3, then step 402 is entered where a DNS query for the domain name determined to be related to the monitored non-DNS related network traffic is generated. In 404, the returned IP address from the generated DNS query is compared with the IP address seen as a destination IP address for the same related connection determined (in step 202).

Alternatively, in the event that matching domain names were not found in the method step 306, then a reputation database may be queried about what kind of IP addresses are known to be associated with the domain name. The reputation database may be part of a backend or a cloud service, for example. Some DNS load balancing configurations/solutions are known to give different IP address results for each consecutive DNS query for the domain. This means that executing the DNS query two or more times or requesting from the cloud may mitigate related false positive risk. For example, if a DNS query for the domain name always or often gets different IP address returned, then a determination can be made that the related to this domain name is problematic or suspicious. In an embodiment, as a DNS resolution check may have been done securely to ensure that hijacking has not happened, the result of the check should be trusted. If a domain name thus always gets a different IP address returned, then the problematic part here refers to the result being a false positive.

In 406, it is determined whether the returned IP address and the destination IP address match. In the event that the returned IP address and the destination IP address do not match, then step 408 is entered where it is determined that the local resolution configuration/hosts file has entry for the domain name and an alert is triggered. In the event that the returned IP address and the destination IP address match, then step 410 is entered where it is determined that the local resolution configuration/hosts file has not changed.

In an embodiment, even if matching domain names were not found in 306, then no further process steps as described above in relation with FIG. 4 are not necessary. Instead it can be concluded that the hosts file has been changed since DNS query for the related domain has not been detected. However, in the event that the component processing the security inspection is not online when observing the related DNS query, then processing the steps of FIG. 4 enables the component to catch up by doing the same query by itself.

The embodiments of the present invention thus monitor what kind of DNS queries computer has generated and verifies if connections to routable IP addresses related to domain names also match with IP addresses seen in DNS reply messages for those queries. If there are no matching IP addresses for the inspected domains then it is an indication that the computer uses an internal resolution method to a local configuration file, e.g. to hosts file, for that domain.

The example system configuration underlying the thus illustrated procedure basically corresponds to the system configuration of FIG. 1A, and it is assumed that the integrity check function according to exemplifying embodiments of the present invention is implemented/realized by/at an integrity check device and a any device related thereto. The integrity check device and its related device can be collocated/integrated (as indicated by a dashed box) or separated.

According to exemplifying embodiments of the present invention, the integrity/security check together with the functionality of providing an integrity/security evaluation result, i.e. an indication of whether or not the service device is affected by malware, by pharming attack, DNS hacking or hijacking, is accomplished by or under control of the integrity check device. As mentioned above, the above-described principles according to exemplifying embodiments of the present invention are generally applicable in different situations, i.e. different scenarios, network topologies, system environments, or the like.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Figure 5:
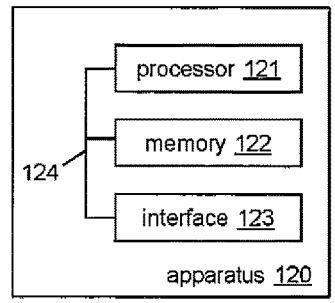
FIG. 5 shows a schematic diagram illustrating an example of a structure of an apparatus according to exemplifying embodiments of the present invention.

FIG. 5 shows a schematic diagram illustrating an example of a structure of an apparatus according to exemplifying embodiments of the present invention.

As indicated in FIG. 5, an apparatus 120 according to exemplifying embodiments of the present invention may comprise at least one processor 121 and at least one memory 122 (and possibly also at least one interface 123), which may be operationally connected or coupled, for example by a bus 124 or the like, respectively.

The processor 121 of the apparatus 120 is configured to read and execute computer program code stored in the memory 122. The processor may be represented by a CPU (Central Processing Unit), a MPU (Micro Processor Unit), etc., or a combination thereof. The memory 122 of the apparatus 120 is configured to store computer program code, such as respective programs, computer/processor-executable instructions, macros or applets, etc. or parts of them. Such computer program code, when executed by the processor 121, enables the apparatus 120 to operate in accordance with exemplifying embodiments of the present invention. Further, the memory 122 of the apparatus 120 may store or at least temporarily hold any relevant information, such as information of uniquely determined resources, a registration of users of a service providing the integrity/security check, commonly known DNS servers and their IP addresses, ASN/IP mappings, additional useful information for user information purposes, or the like. The memory 122 may be represented by a RAM (Random Access Memory), a ROM (Read Only Memory), a hard disk, a secondary storage device, etc., or a combination of two or more of these. The interface 123 of the apparatus 120 is configured to interface with another apparatus and/or the user of the apparatus 120. That is, the interface 123 may represent a communication interface (including e.g. a modem, an antenna, a transmitter, a receiver, a transceiver, or the like), and could also comprise a user interface (such as a display, touch screen, keyboard, mouse, signal light, loudspeaker, or the like).

The apparatus 120 may, for example, represent a (part of a) integrity check function or device. The apparatus 120 may be configured to perform a procedure and/or exhibit a functionality as described in any one of FIGS. 3 to 4.

The apparatus 120 or its processor 121 (possibly together with computer program code stored in the memory 122), in its most basic form, is configured to: monitor DNS related network traffic comprising domain name-to-IP key-value pairs, monitor at least such non-DNS related network traffic that is targeting routable IP addresses, determine whether the monitored non-DNS related network traffic is related to a domain name. In the event that the monitored non-DNS related network traffic is determined to be related to a domain name, the apparatus 120 or its processor 121 is further configured to search the monitored DNS related network traffic for a matching domain name and in the event that the matching domain name is found in the search, to determine whether IP addresses related to the matching domain names also match, and in the event that the IP addresses related to the matching domain names do not match, to determine that internal name-to-IP resolution to local configuration file is used for the domain name and triggering an alert.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 5 above, i.e. by one or more processors 121, one or more memories 122, one or more interfaces 123, or any combination thereof.

Figure 6:
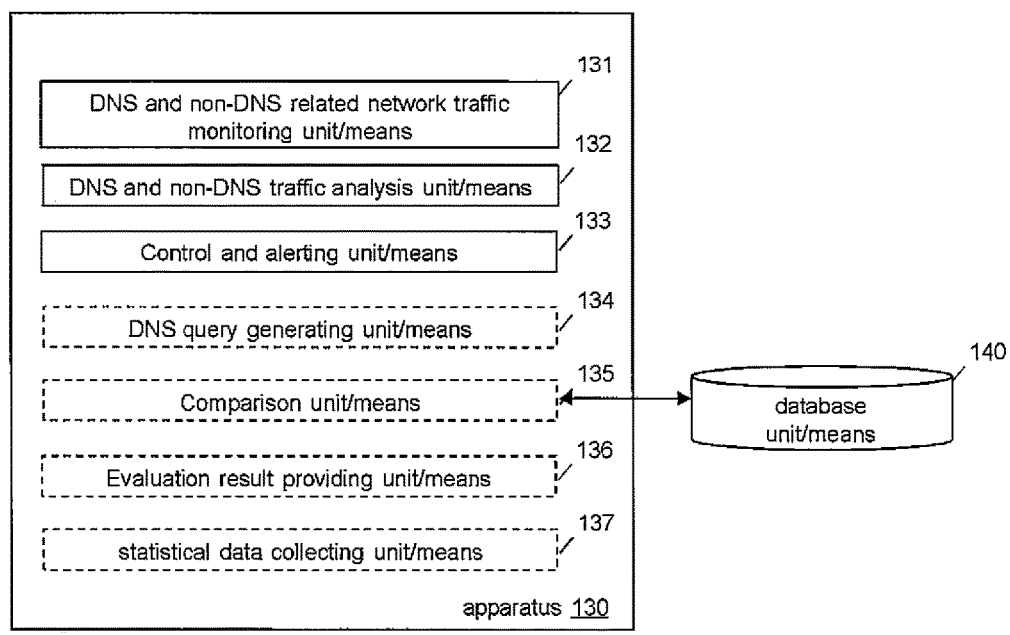
FIG. 6 shows a schematic diagram illustrating another example of a structure of an apparatus according to exemplifying embodiments of the present invention.

FIG. 6 shows a schematic diagram illustrating another example of a structure of an apparatus according to exemplifying embodiments of the present invention.

As shown in FIG. 6, an apparatus 130 according to exemplifying embodiments of the present invention may comprise (at least) a unit or means for monitoring both DNS and non-DNS related network traffic (denoted as DNS and non-DNS related network traffic monitoring unit/means 131), a unit or means for analyzing the monitored DNS and non-DNS related network traffic (denoted as DNS and non-DNS traffic analysis unit/means 132), and a unit or means for controlling and alerting the apparatus on the basis of the results from the analysis (denoted as control and alerting processing unit/means 133).

As further shown in FIG. 6, an apparatus 130 according to exemplifying embodiments of the present invention may additionally comprise (at least) a unit or means for generating a DNS query 134, and/or a comparison unit or means 135, and/or a unit or means for evaluating the results 136, and/or a unit or means for collecting statistical data 137.

As further shown in FIG. 6, the comparison unit/means 135 is operable to interact/cooperate with at last one database (denoted as database unit/means 140). Such database may for example be or comprise a dedicated and/or combined data store for DNS servers, ASNs, trustworthiness information, reputation information, DNS records, or the like. Depending on the kind of integrity evaluation performed, a corresponding interaction/cooperation may take place, such as in the context of any evaluation in any one of operations as described above in relation with FIGS. 3 and 4. Irrespective of the illustration in FIG. 6, the database unit/means 140 may be implemented in/at the apparatus 130 (e.g. stored in the memory 122 in FIG. 5) or in/at any other entity.

For further details regarding the operability/functionality of the individual units/means according to exemplifying embodiments of the present invention, reference is made to the above description in connection with any one of FIGS. 1 to 5, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A computer-implemented method for protecting a computer from malicious attacks, comprising executing on a processor the steps of:
   a) monitoring network traffic from a first device configured to provide DNS-based address resolution functionality for the network traffic, wherein the network traffic comprises DNS (Domain Name System) name-to-IP resolution related network traffic comprising domain name-to-IP key value pairs;
   b) monitoring further network traffic from a further device that is not configured to provide for DNS-based address resolution functionality for the further network traffic, wherein the further network traffic comprises name-to-IP resolution related network traffic that is targeting routable IP (Internet Protocol) addresses;
   c) determining that the monitored further name-to-IP resolution related network traffic is related to a domain name;
   d) based on the monitored further name-to-IP resolution related network traffic determined to be related to a domain name, searching for and finding a domain name associated with the monitored DNS related network traffic and identifying that the domain name related to the monitored further name-to-IP resolution related network traffic and the domain name associated with the monitored DNS related network traffic are matching domain names;
   e) based on the matching domain names being found in the searching, determining that IP addresses related to the matching domain names do not match, and based on determining that the IP addresses do not match, determining that an internal name-to-IP resolution from a local configuration file of the computer is used for the domain name; and
   f) based on determining that the internal name-to-IP resolution from the local configuration file of the computer is used for the domain name and that the IP addresses related to the matching domain names do not match, preventing or restricting communication related to the domain name.

2. The method according to claim 1, wherein based on matching domain names not being found in step d), the method further comprising:
   generating a DNS query for the domain name determined to be related to the monitored further name-to-IP resolution related network traffic in step c);
   comparing returned IP address from the generated DNS query with the IP address seen as a destination IP address for the same monitored further name-to-IP resolution related network traffic determined in step c);
   determining that the local configuration file has entry for the domain name based on that the returned IP address and the destination IP address do not match and triggering an alert; and
   determining that the local configuration file has not changed based on that the returned IP address and the destination IP address match.

3. The method according to claim 1, wherein based on matching domain names not being found in step d), the method further comprising:
   executing two or more DNS queries for the domain name determined to be related to the monitored further name-to-IP resolution related network traffic in step c) or querying a reputation database for all IP addresses associated with the domain name;
   determining that the related domain name is suspicious based on that a returned IP addresses from the executed two or more DNS queries do not match and triggering an alert.

4. The method according to claim 1, wherein step c) determination comprises at least one of:
   looking at content of HTTP (Hypertext Transfer Protocol) header field "Host:";
   looking at TLS (transport Layer Security) extension "server_name" from "Client Hello" message;
   parsing SMTP (Simple Mail Transfer Protocol) server domain from the first line a server sends.

5. The method according to claim 1, wherein the triggering of alert comprises at least one of: sending an email message, displaying message in a pop-up window, generating an instant message, generating a text message.

6. A computer apparatus, comprising
   a non-transitory memory configured to store computer program code, and
   a processor configured to read and execute computer program code stored in the non-transitory memory, wherein the processor is configured to cause the computer apparatus to perform:
   a) monitoring network traffic from a first device configured to provide DNS-based address resolution functionality for the network traffic, wherein the network traffic comprises DNS (Domain Name System) name-to-IP resolution related network traffic comprising name-to-IP key value pairs;
   b) monitoring further network traffic from a further device that is not configured to provide for DNS-based address resolution functionality for the further network traffic, wherein the further network traffic comprises further name-to-IP resolution related network traffic that is targeting routable IP addresses;
   c) determining that the monitored further name-to-IP resolution related network traffic is related to a domain name;
   d) based on the monitored further name-to-IP resolution related network traffic determined to be related to a domain name, searching for and finding a domain name associated with the monitored DNS related network traffic and identifying that the domain name related to the monitored further name-to-IP resolution related network traffic and the domain name associated with the monitored DNS related network traffic are matching domain names;
   e) based on the matching domain names being found in the searching, determining that IP addresses related to the matching domain names do not match, based on that the matching domain names is found in the searching; and
   f) based on determining that internal name-to-IP resolution to the local configuration file of the computer is used for the domain name and that the IP addresses related to the matching domain names do not match, preventing or restricting communication related to the domain name based on that the internal name-to-IP resolution to the local configuration file is determined to be used for the domain name.

7. The computer apparatus according to claim 6, wherein, based on matching domain names not being found in d), the processor is further configured to cause the computer apparatus to perform:
generating a DNS query for the domain name determined to be related to the monitored further name-to-IP resolution related network traffic in step c);
comparing returned IP address from the generated DNS query with the IP address seen as a destination IP address for the same monitored further name-to-IP resolution related network traffic in step c);
determining that the local configuration file has entry for the domain name based on that the returned IP address and the destination IP address do not match and triggering an alert; and
determining that the local configuration file has not changed based on that the returned IP address and the destination IP address match.

8. The computer apparatus according to claim 6, wherein, based on matching domain names not being found in step d), the processor is further configured to cause the computer apparatus to perform:
executing two or more DNS queries for the domain name determined to be related to the monitored further name-to-IP resolution related network traffic in step c) or querying a reputation database for all IP addresses associated with the domain name;
determining that the related domain name is suspicious and triggering an alert based on that a returned IP addresses from the executed two or more DNS queries or from the database query do not match.

9. The computer apparatus according to claim 6, wherein the processor is configured to cause the computer apparatus to perform step c) determination by at least one of:
looking at content of HTTP header field "Host:";
looking at TLS extension "server_name" from "Client Hello" message;
parsing SMTP server domain from a first line a server sends.

10. The computer apparatus according to claim 6, wherein the processor is configured to cause the computer apparatus to perform the triggering of alert by at least one of: sending an email message, displaying message in a pop-up window, generating an instant message, generating a text message.

11. A non-transitory computer storage medium having stored thereon a computer program code for implementing the method of claim 1.

* * * * *